May 4, 1965  J. E. FRAZIER ETAL  3,182,113
ELECTRIC GLASS MELTING FURNACE
Filed Oct. 4, 1962  3 Sheets-Sheet 1

INVENTORS.
JOHN EARL FRAZIER
NELSON L. MURPHY
BENJAMIN A. ELIA and
JAMES C. McCREARY
BY
*Christy, Pannales & Strickler* their ATTORNEYS

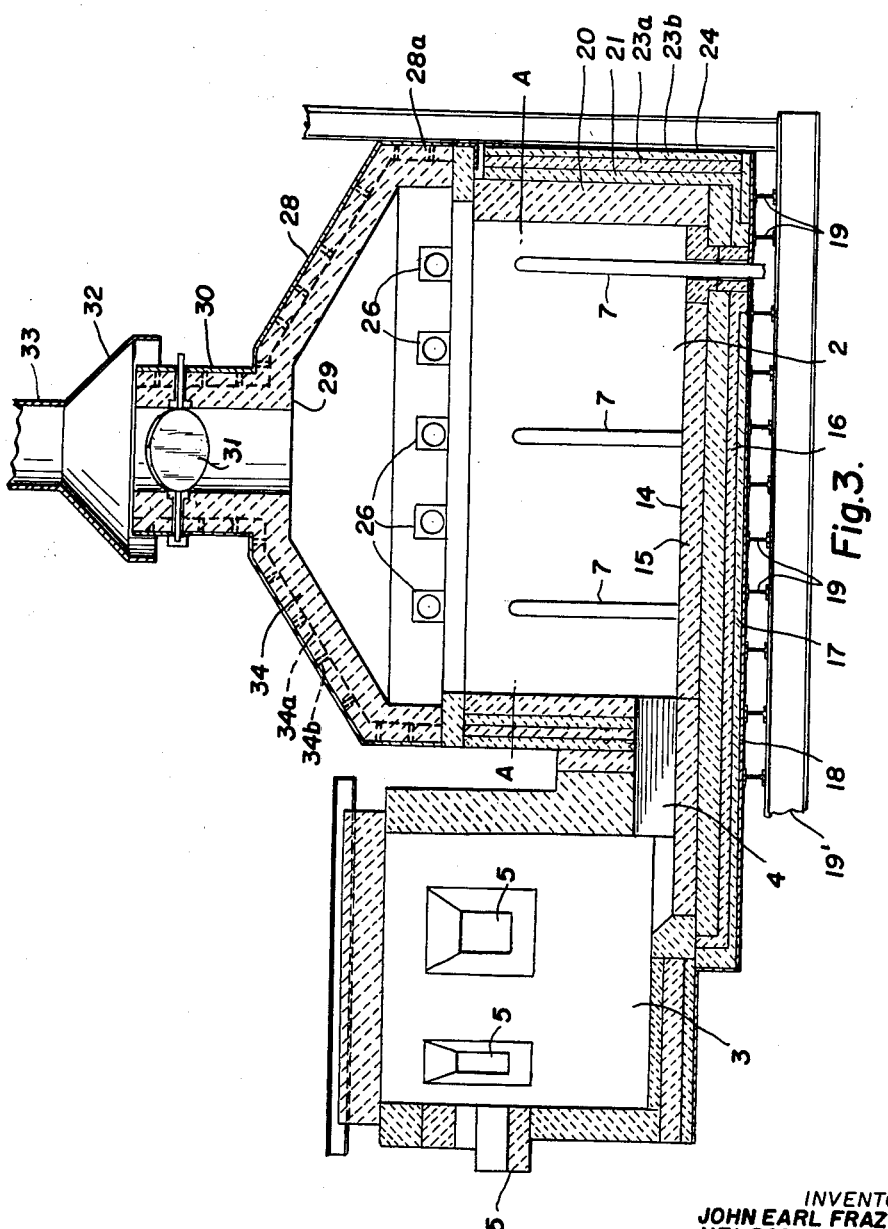

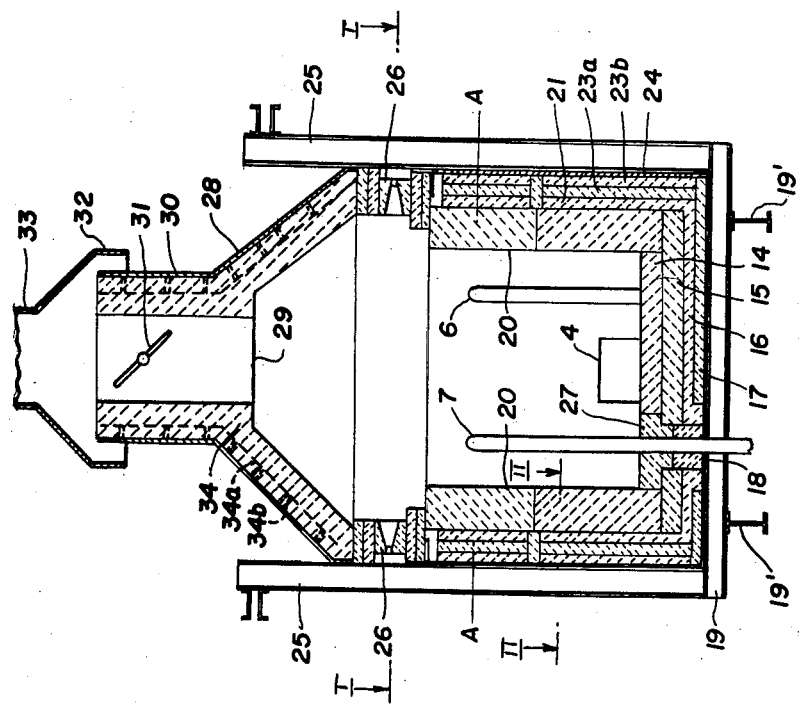
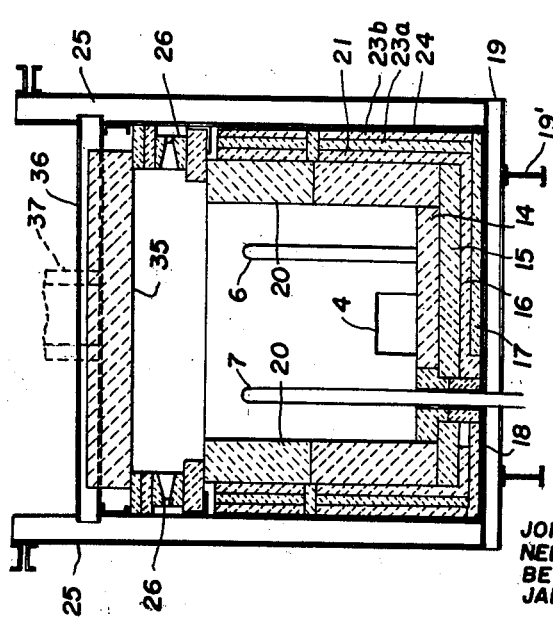

3,182,113
ELECTRIC GLASS MELTING FURNACE
John Earl Frazier and Nelson L. Murphy, Washington, Benjamin A. Elia, Houston, and James C. McCreary, Washington, Pa., assignors to Frazier-Simplex, Inc., Washington, Pa., a corporation of Delaware
Filed Oct. 4, 1962, Ser. No. 228,365
13 Claims. (Cl. 13—6)

This invention relates to the melting of batch materials to produce glass and is for an improvement in furnaces for this purpose in which immersed electrodes supply the heat for the furnace.

It has heretofore been proposed to construct a glass melting furnace in which electrodes are placed in the bottom of the melting tank. An initial charge of batch materials is melted to a liquid state with combustible fuel, such as oil or gas. At this stage the electrodes are generally retracted into the tank bottom. The molten glass becomes a semi-conductor of electricity, and after the initial shallow melt has been produced, the electrodes are raised through the bottom to the depth of the melt and an electric current is passed from one electrode to another through the glass, which is further heated by the flow of current through it. Additional batch material is charged into the furnace and it floats on the first melted charge. The floating batch material is melted at the interface of the liquid glass and floating batch material, and as melting continues, more batch is added. As the depth of liquid glass in the tank increases, the electrodes are pushed further up through the bottom of the tank to expose more surface to the melted glass until a maximum depth at the glass line is reached.

The melted glass flows from the tank as operating conditions are reached into a refining chamber from which it is removed through feeders to be shaped in the usual way. Batch material is added at substantially the same rate that finished glass is removed so as to maintain a substantially constant depth of molten glass in the tank along with a covering of the floating batch material of nearly uniform depth.

It has also been found desirable to use commercial three-phase alternating current as the energy source for the electrodes and to space the electrodes equal distances apart, a desirable arrangement for a three-phase current comprising two spaced rows of three equally spaced electrodes each with the electrodes of one row being staggered midway between the electrodes of the other row, and with the space between the two rows being equal to the distance between electrodes in the row. Straight lines drawn from any electrode in one row to the opposite two electrodes of the other row describe a delta or equilateral triangle. For polyphase currents which are multiples of three more electrodes may be used, maintaining, however, a delta relationship where each electrode is one point of one or more triangles. The electrical advantages of this disposition of the electrodes for polyphase currents forms no part of this invention except to point out that the distance for current flow through the glass from any one electrode to the nearest one or ones of opposite polarity is always the same.

However, this disposition of electrodes does not accommodate itself to effective use in glass melting tanks of conventional design, and it is the purpose of this invention to provide a furnace to enable electrodes so disposed to be effectively employed. To this end the present invention provides a furnace of unique shape and construction, as will hereinafter more fully appear.

An object of the invention therefore is to provide a furnace especially adapted for use where glass is heated by immersed electrodes adapted to be energized by a polyphase current wherein the electrodes are positioned to provide a uniform distance between two electrodes of opposite polarity.

A further object of the invention is to provide an electrically heated glass melting furnace in which convective currents of molten glass take place throughout the area of the tank, eliminating excessively stagnant areas.

A further object is to provide a glass melting furnace of this type in which the electrodes are positioned out of the direct line of flow of molten glass from the tank to the refining chamber.

A still further object is to provide a unique roof structure for an electric glass melting furnace.

These and other objects and advantages are secured by our invention as will be more fully understood by those skilled in the art from the following description in conjunction with the accompanying drawings, in which:

FIG. 3 is a longitudinal vertical section through the furnace;

FIG. 4 is a transverse vertical section in the plane of line III—III of FIG. 1 and showing a preferred roof construction; and FIG. 5 is a view similar to FIG. 4 showing a different roof construction.

Figure 1:
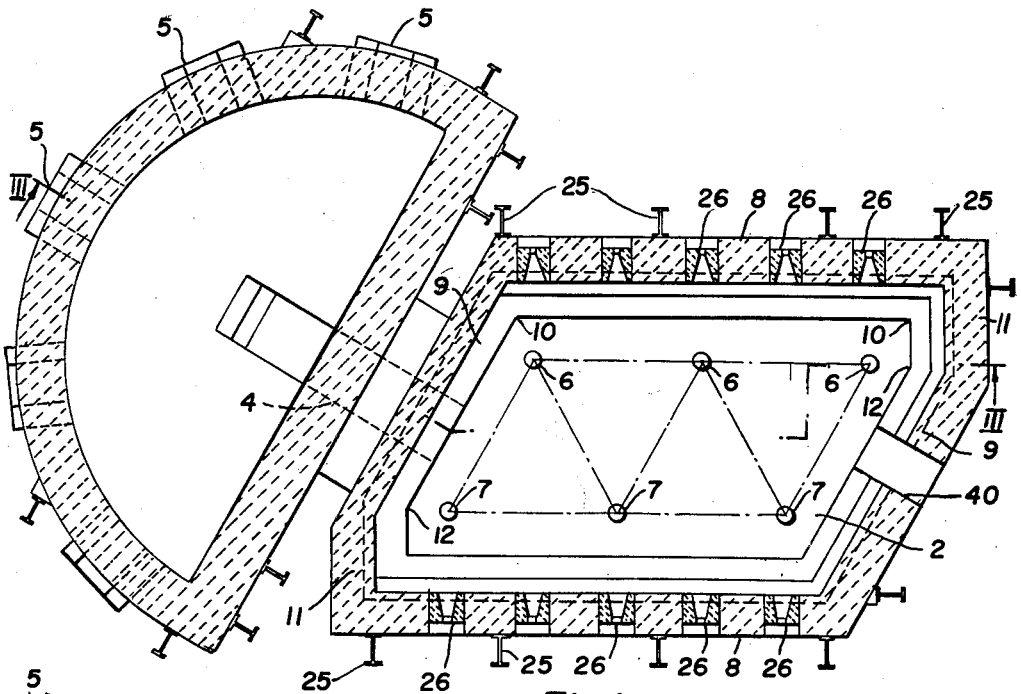
FIG. 1 is a horizontal section through the furnaces at the level of the gas burners, being in substantially the plane of line I—I of FIG. 4.
Figure 2:
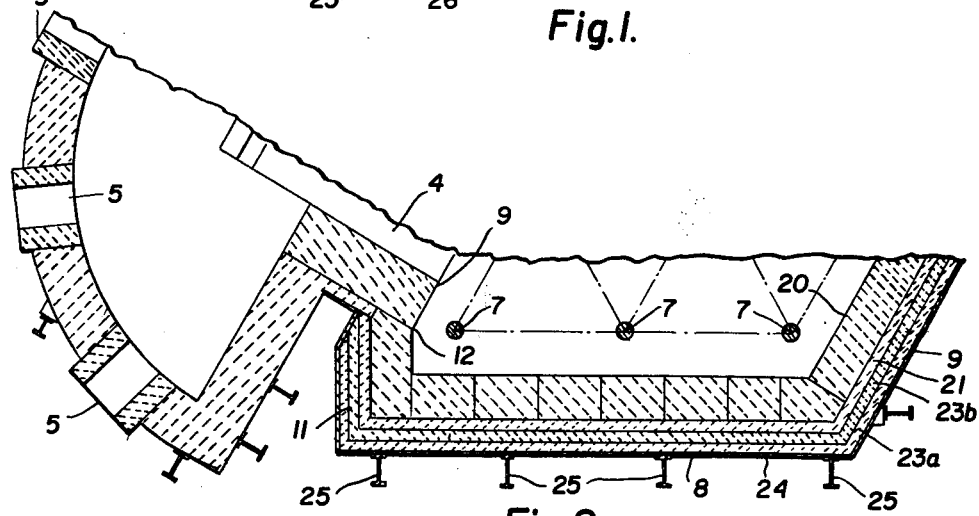
FIG. 2 is a half section similar to FIG. 1 but at a lower level, being in the plane of line II—II of FIG. 4.

It may be first pointed out that conditions of operation in an electrically heated furnace are quite different from a gas or oil fired furnace. The furnace installation is much smaller and requires less floor space where electric heat is used because the extensive checker brick constructions for recuperating heat from outgoing combustion gases are not required. However, since the batch material is not conductive until it is fused into glass, gas or oil burners must be used in starting up the furnace.

With fuel fired burners the flame is over the glass and heat must be absorbed from the top down. With submerged electrode heating, the glass is hottest at the bottom of the tank and batch materials float on the surface, forming to a considerable extent a shield against loss of heat by radiation. Instead of the roof being subject to the greatest thermal stress and deterioration by flame action, the tank is subject to greatest thermal stresses after the initial start-up, but the roof must be constructed to take care of burners in the start-up period.

In a submerged electrode furnace, the heat is more effectively utilized than with fuel firing so that a greater tonnage may be produced in a smaller tank. Convective flow of molten glass is upwards in the area around the electrodes, under the overlying blanket of unmelted batch and downward further out from the electrodes.

Referring to the drawings, 2 designates the melting tank, 3 is a refining section, 4 is the throat from the melting tank to the refining section, while 5 designates feeder openings or feeders for the molten glass.

Referring to FIG. 1, there are two rows of three equally spaced electrodes 6 and 7 extending upwardly through the bottom of the melting tank, the electrodes of one row being staggered midway between those of the other. The distance between the rows is the same as the distance between electrodes in each row. The broken lines drawn from the center of the electrodes forms a series of alternately disposed deltas or equilateral triangles. In a typical glass melting furnace the distance between electrode centers is about forty-eight inches, but this may vary with different sized tanks and a different number of electrodes.

According to the present invention the tank is in the shape of a modified parallelogram or an unequal hexagon with two diagonally opposite 90° corners and two diagonally opposed obtuse angular corners. There are two long sides 8 parallel with the rows of electrodes. There are two opposite long end wall sections 9, each extending from one of the two side walls and making an obtuse angle therewith, these two angles being designated 10. These long end wall sections are spaced from and parallel with lines drawn between centers of corresponding end electrodes of the two rows. There are two opposite short end wall sections 11, one extending at right angles from one of each of the side walls to the long end wall section. They merge into the longer end wall sections at obtuse angles 12. The side walls of the tank therefrom form no acute angles with each other and the distance from the electrodes to the nearest side and end walls is the same except that at the corners between end and side walls the distance is slightly greater, but even here is less than half the distance between any two electrodes. In the furnace shown with a forty-eight inch spacing between electrodes, this distance to the side and end walls is about twelve inches, but this is mentioned only by way of illustration.

The submerged throat 4 leading from melting tank to the refining section is located on one of the longer end wall sections and its axis is normal to this wall, so that its center line is oblique to the center line of the melting tank. Its center line intersects the center line of the melting tank in the plane of the inner face of the end wall section from which it extends, so that the center line of the throat is closer to one side wall than the other and it is not centered in the long end wall section from which it projects.

All of this geometry is important to securing the most even heating of the glass, the least stagnation and the least wash of the flowing glass against the electrodes, especially those nearest the discharge throat.

The bottom of the melting tank is comprised of a fusion cast refractory slab 14 supported on a bed of fluxed fire clay 15. Beneath this is a layer of high density fire brick 16 below which is a layer 17 of low density insulating brick. There is a metal bottom plate 18 carried on transversely-extending structural beams 19, these in turn resting on longitudinal beams 19′ that compromise part of the structural frame for supporting the tank above the level of the glass working floor.

The melt level in the tank is kept at about the level of line A—A in FIGS. 3 and 4 and the side and end walls of the tank from a distance slightly above this level to the bottom which are comprised, in order, from the inside out, of lining blocks 20 should be fused case sidewall blocks similar to those generally used in fuel fired glass melting tanks. Outside of this is a wall of high density fire brick 21. There is low density insulating brick, two thicknesses 23a and 23b of this low density brick being here indicated. There are plate metal side walls 24 forming with the bottom plate an encasing metal binding or shell. Structural metal columns or buck-stays are indicated at 25.

Above the lining blocks 20 the side walls are set back and may be formed of fire clay with a row of burner blocks 26 at spaced intervals therealong. Preferably the burner blocks along one side are staggered between those of the other side. These accommodate gas or oil fuel burners of any suitable known construction, not shown.

Since the furnace below the melt line A—A is subject to higher temperatures than the combustion space, the use of insulating brick of low density allows for the expansion of the side walls without excessive stressing of the refractory and the metal shell, which has a higher coefficient of thermal expansion, is protected from excessive heat so that a compensating effect is built into the bottom and lower wall structures.

In the bottom are special refractory bushings 27 through which the electrodes pass. Mechanism forming no part of the present invention raises these electrodes at start-up as the depth of the melt increases and lowers them when the furnace is emptied so that they are not exposed of the flame during start-up and do not encounter the batch materials. They are not raised above the melt line A—A.

Since the furnace must be fuel fired at the start-up, and the burners are all in use at the same time, and gases are not exhausted through the burner ports into recuperators, the roof must be constructed to vent the combustion gases at start-up and remove vapors that are generated during the operation of the furnace. However, for the reasons previously pointed out the roof is not subjected for continuous periods to intense flame and gas environment for long periods of time. Therefore, the roof is preferably in the form of a plate metal hood 28, shaped at its base to the contour of the melting tank and is set on the side and end walls. Its sides are vertical for a short distance as indicated at 28a and then converge upwardly toward a flat central area 29. In the center of this area is a flue outlet 30. There is a damper 31 in this outlet that would be properly adjusted when the burners are operating, but may be closed except to the extent necessary to remove vapors generated during operation under electric firing. It terminates under a hood 32 leading to a stack or draft column 33. The roof hood 28 is lined with a cast refractory 34 that is preferably cast over a reinforcing net 34a carried on studs 34b on the inner surface of the metal hood.

Instead of using a hood of the type described, the roof may be flat and of a more conventional structure, as shown in FIG. 5. Here the roof refractory 35 is suspended from struts 39 extending across the furnace and attached to horizontal beams 36 carried by the vertical columns 25 previously described. Provision may be made for withdrawing gases through a stack outlet 37 with a damper similar to the arrangement first described.

In either case the roof may expand and contract free of the side walls and vice versa. The hood arrangement has the advantage of removability and is cheaper.

Batch material is charged into the furnace through a feeder (not shown) and feeder opening 40 in the long end wall section opposite the outlet throat.

The throat 4 through which the molten glass flows is of course formed of refractory and is located level with the floor of the melting tank. The refining chamber is of a more or less conventional construction and may be heated electrically or by fuel burners, the heat requirements being low because of the high temperature of the incoming glass, the relatively short average time the glass remains in this section and the feasibility of supplying additional heat if necessary in the feeders. The straight back wall of the forehearth is transverse to the axis of the throat 4 so that the forehearth is angularly disposed relative to the longitudinal axis of the tank.

It will be seen that with our invention there is a group of equally spaced electrodes arranged in a definite configuration with each electrode being at the apex of one or more deltas or equilateral triangles for the desired distribution of polyphase current thereto. The tank has the same configuration with the vertical walls uniformly spaced about the group of electrodes and the distance from any vertical wall in a direction normal to the plane of the wall is less than the distance from any electrode to any other electrode in the same triangular group. Such a furnace must therefore be symmetrical about the electrode group and cannot be a rectangle or a circle. With a three-phase current the tank is a modified parallelogram, as shown.

We claim:

1. An electrically heated glass melting furnace utilizing submerged electrodes so positioned as to constitute two rows in which the electrodes of one row are equally spaced from each other and the distance between rows is equal to the spacing of the electrodes in the rows and the electrodes of one row are staggered midway between the electrodes of the other row, a melting tank having a bottom through which the electrodes extend up into the tank, the tank having vertical side and end walls describing a modified parallelogram having opposite long side walls parallel with the rows of electrodes, each side wall being spaced from the nearest row of electrodes a distance less than the spacing between electrodes, the tank having two ends walls comprising a long section and a short section, diagonally opposite ends of the two side walls being joined to the long section of an end wall forming an obtuse angle therewith and diagonally opposite ends of the short sections, forming right angles therewith, the long and short sections forming an obtuse angle at their junctions, the long end wall sections being parallel with a line of centers drawn from the end electrode in one row to the corresponding end electrodes in the other row, one vertical wall having a charging opening therethrough and another wall having a discharge throat leading therefrom, and a cover over the melting tank.

2. An electrically heated glass melting furnace as defined in claim 1 in which the end walls are spaced from the nearest electrodes the same distance as the side walls.

3. An electrically heated glass melting furnace as defined in claim 1 in which the discharge throat extends outwardly from the long section of one end wall at right angles thereto, and a forehearth into which said throat opens disposed at an angle to the longitudinal axis of the tank.

4. An electrically heated glass melting furnace as defined in claim 1 in which the discharge throat extends outwardly from the long section of one end wall at right angles thereto, and a forehearth into which said throat opens disposed at an angle to the longitudinal axis of the tank, the charging opening being in the long section of the opposite end wall.

5. An electrically heated glass melting furnace as defined in claim 1 in which the discharge throat extends outwardly from the long section of one end wall at right angles thereto, and a forehearth into which said throat opens disposed at an angle to the longitudinal axis of the tank, the axis of the discharge throat intersecting the plane of the longitudinal center line of the tank midway between the two electrodes nearest the end wall in which the throat is located.

6. An electrically heated glass melting furnace as defined in claim 1 in which the glass vertical walls of the melting tank have a refractory lining to a height slightly above the maximum height of the electrodes and the longitudinal walls have burner block arranged therealong at a level above the top of the said refractory lining.

7. An electrically heated glass melting furnace as defined in claim 1 in which the glass vertical walls of the melting tank have a refractory lining to a height slightly above the maximum height of the electrodes and the longitudinal walls have burner block arranged therealong at a level above the top of the said refractory lining, the cover over the tank comprising an upwardly arching structure shaped to set on the walls of the tank, the cover having a flue outlet therein for the removal of combustion gases from the furnace.

8. An electrically heated glass melting furnace as defined in claim 1 in which the vertical walls of the melting tank have a refractory lining to a height slightly above the maximum height of the electrodes and the longitudinal walls have burner block arranged therealong at a level above the top of the said refractory lining, the cover over the tank comprising an upwardly arching structure shaped to set on the walls of the tank, the cover having a flue outlet therein for the removal of combustion gases from the furnace, said upwardly arching structure comprising a hood with an exterior metal shell having the interior thereof lined with refractory.

9. An electrically heated glass melting furnace as defined in claim 2 in which the interior walls and floor of the tank are of a refractory resistant to the molten glass to a level above the level at which molten glass will be retained in the tank, heavy duty fire brick outside said interior walls, low density heat insulating refractory outside the heavy duty brick, and a metal shell in which the bottom and sides are contained.

10. An electrically heated glass furnace having a melting tank with a bottom and sides, a plurality of electrodes in the bottom of the tank projecting up into the tank arranged in a pattern which provides four equilateral triangles with their centers in a line with two triangles pointing opposite to the other two, the side walls of the tank being uniformly spaced from the pattern defined by the electrodes, the end walls being uniformly spaced from the pattern defined by the electrodes and the same distance therefrom as the side walls, the distance from any electrode to the nearest side wall being less than the distance between electrodes, the side and end walls defining a modified parallelogram in which all interior angles are at least 90° and the end walls comprise long and short angularly abutting sections, with the long section and the short section at one end being diagonally opposite the long section and short section at the other end, the tank having an outlet throat in one end wall, the other end wall having a feed opening therein, and a cover for the tank.

11. An electrically heated glass furnace having a melting tank with a bottom and sides, a plurality of electrodes in the bottom of the tank projecting up into the tank arranged in a pattern which provides four equilateral triangles with their centers in a line with two triangles pointing opposite to the other two, the side walls of the tank being uniformly spaced from the pattern defined by the electrodes, the end walls being uniformly spaced from the pattern defined by the electrodes and the same distance therefrom as the side walls, the distance from any electrode to the nearest side wall being less than the distance between electrodes, the side and end walls defining a modified parallelogram in which all interior angles are at least 90° and the end walls comprise long and short angularly abutting sections, with the long section and the short section at one end being diagonally opposite the long section and short section at the other end, the tank having an outlet throat in one end wall, the other end wall having a feed opening therein, and a cover for the tank.

12. An electrically heated glass furnace having a melting tank with a bottom and sides, a plurality of electrodes in the bottom of the tank projecting up into the tank arranged in a pattern which provides four equilateral triangles with their centers in a line with two triangles pointing opposite to the other two, the side walls of the tank being uniformly spaced from the pattern defined by the electrodes, the end walls being uniformly spaced from the pattern defined by the electrodes and the same distance therefrom as the side walls, the distance from any electrode to the nearest side wall being less than the distance between electrodes, the side and end walls defining a modified parallelogram in which there are two side walls and two shorter end walls, the end walls comprising a long section and a short section in planes which intersect at an obtuse angle, where they unite, the long section and the short section at one end being diagonally opposite the corresponding sections at the other end, the long sections intersecting the respective side walls with which they join at an obtuse angle and the short sections intersecting the side walls with which they join at a right angle, the tank having an outlet throat in one end wall, the other end wall having a feed opening therein, and a cover for the tank.

13. An electrically heated glass melting furnace comprising a tank of greater length than width with a bottom, vertical walls and a top, a group of equally spaced electrodes in the bottom of the tank extensible upwardly into the tank and arranged in rows extending lengthwise of the furnace with an equal number of electrodes in each row, all the electrodes being arranged in equilateral triangular relation to one another, the tank having a configuration corresponding to the pattern defined by the electrode group with the vertical walls being uniformly spaced around the group, the distance from the face of any vertical wall in a direction normal to the wall to the nearest electrode being less than the spacing between any two electrodes in the same triangular configuration.

References Cited by the Examiner
UNITED STATES PATENTS
2,658,093  11/53  La Burthe _____ 13—6
FOREIGN PATENTS
425,166  9/47  Italy.

RICHARD M. WOOD, *Primary Examiner.*
JOSEPH V. TRUHE, *Examiner.*